Aug. 4, 1936.　　　F. E. KLING　　　2,049,842
ROLLING MILL
Filed April 16, 1934　　　13 Sheets-Sheet 1

Inventor:
FRED E. KLING,
by: Usina & Rauber
his Attorneys.

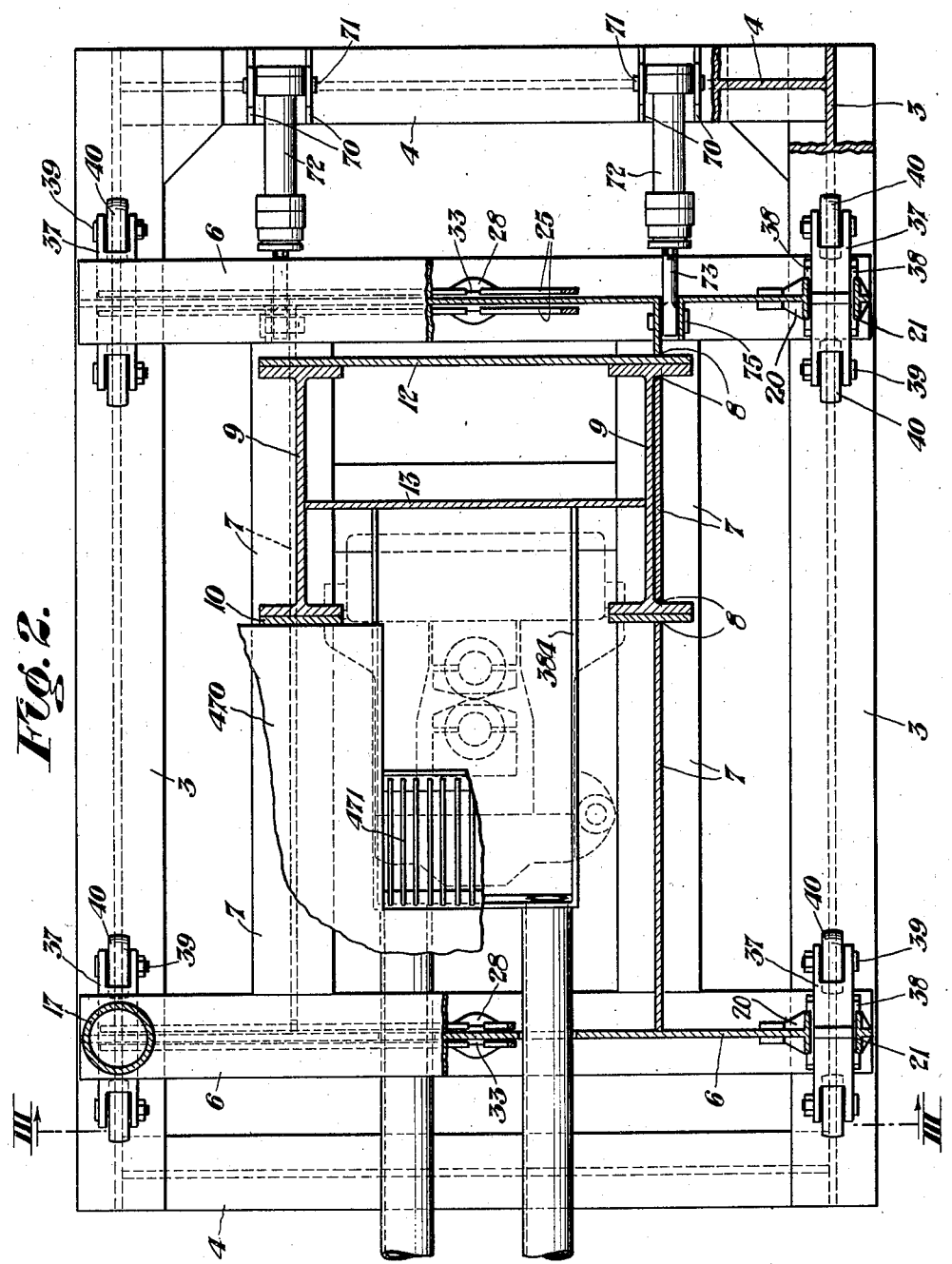

Aug. 4, 1936.　　　　F. E. KLING　　　　2,049,842
ROLLING MILL
Filed April 16, 1934　　　13 Sheets-Sheet 3
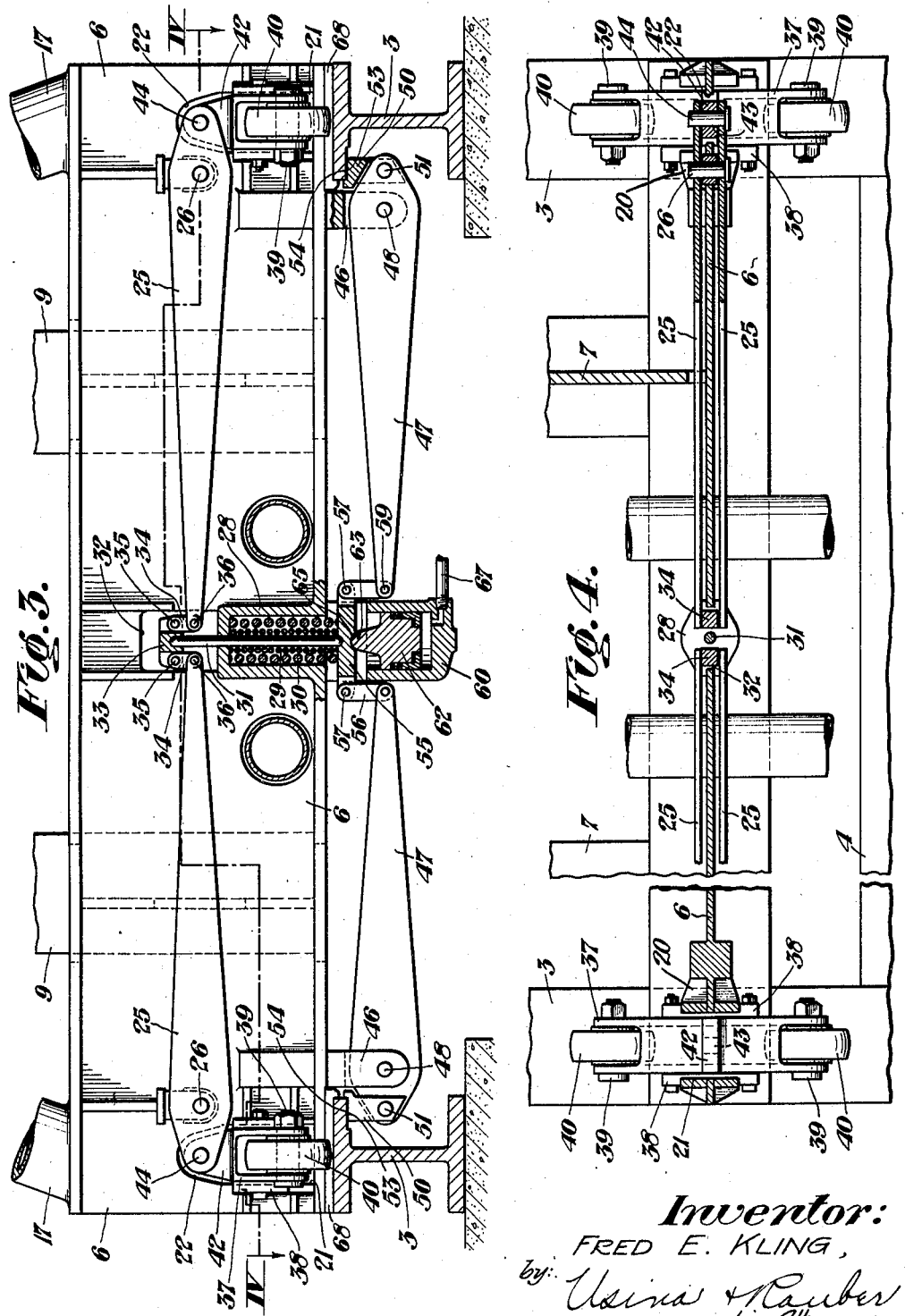
Inventor:
FRED E. KLING,
by Usina & Rauber
his Attorneys.

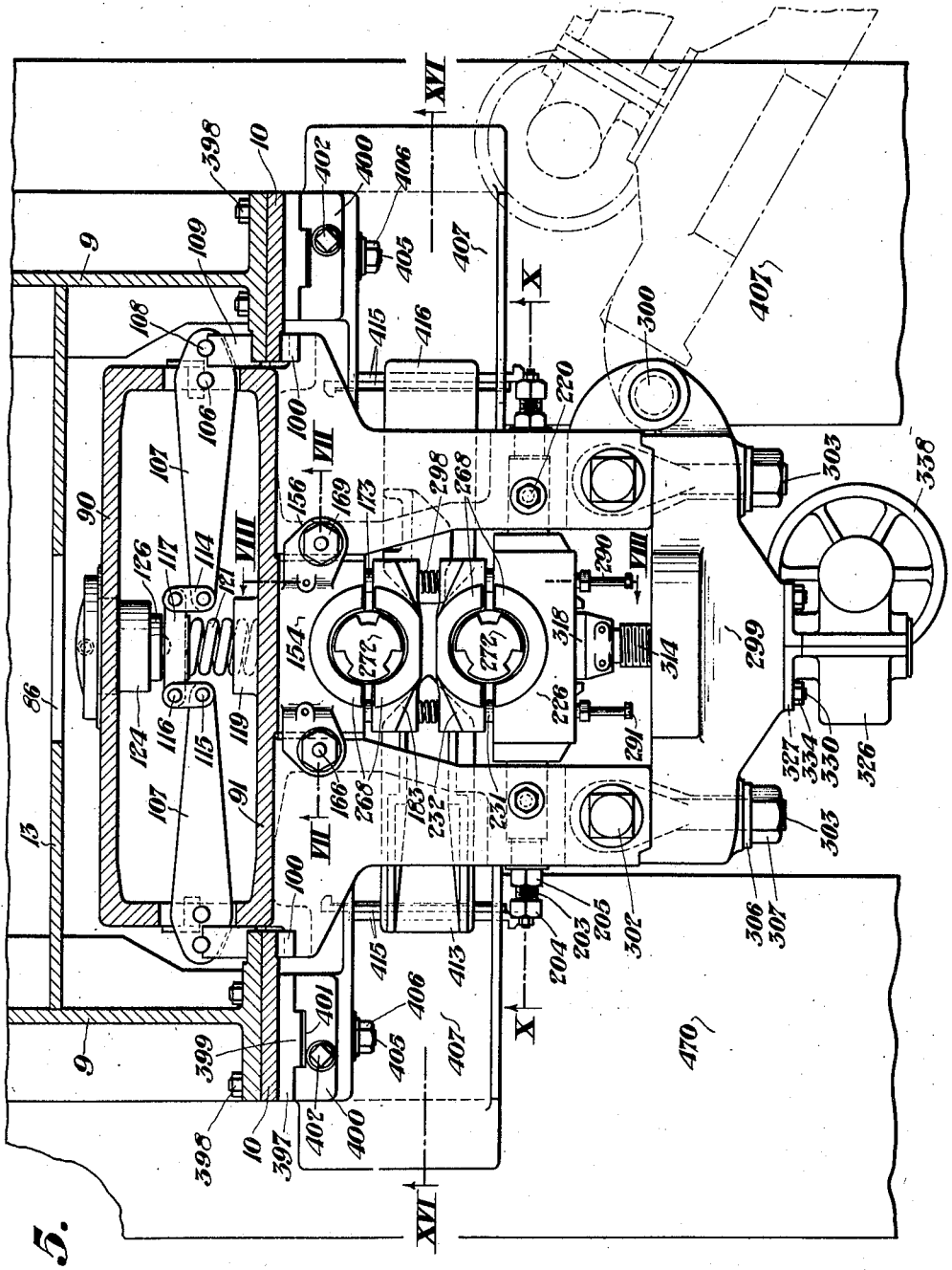

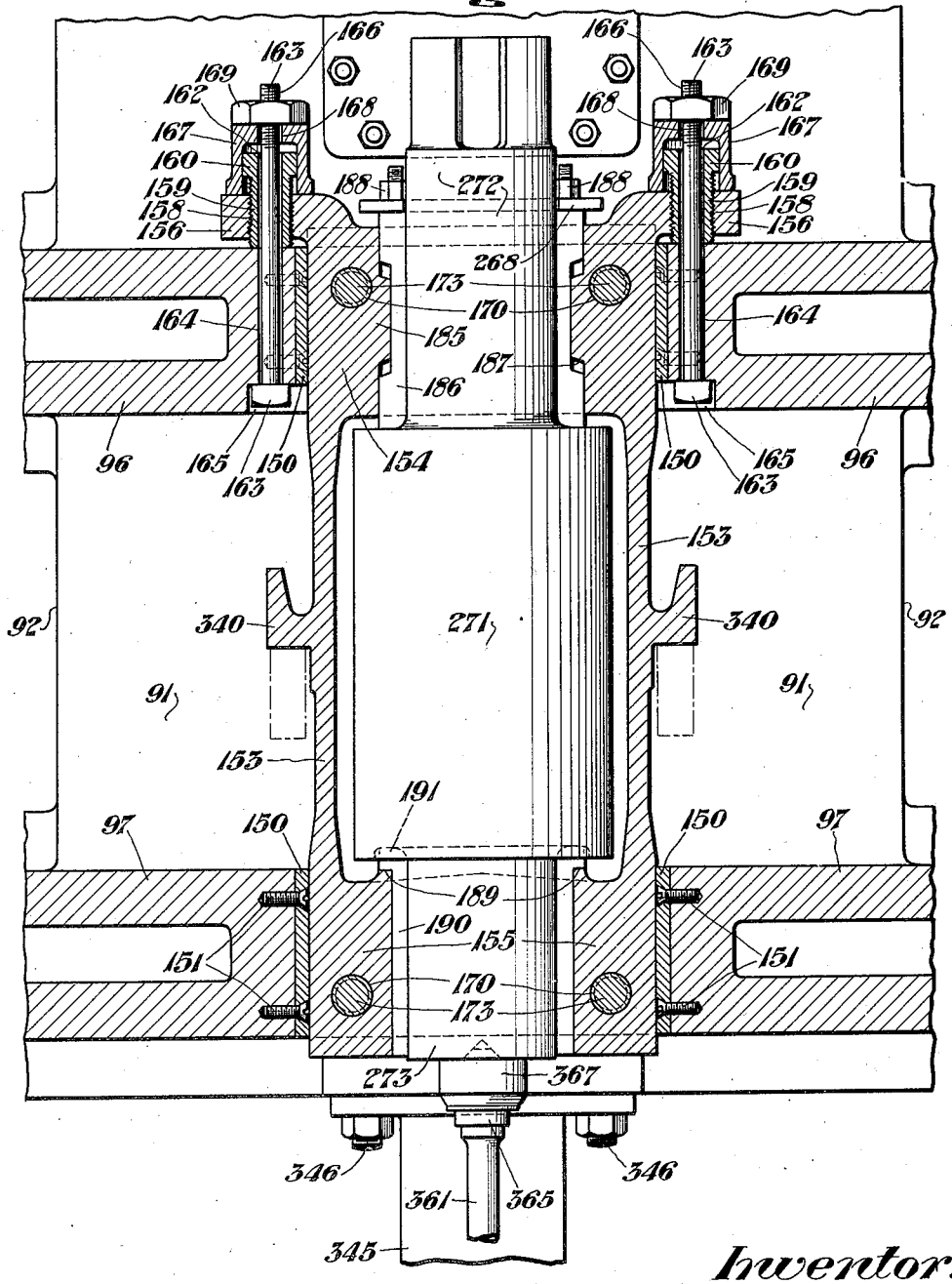

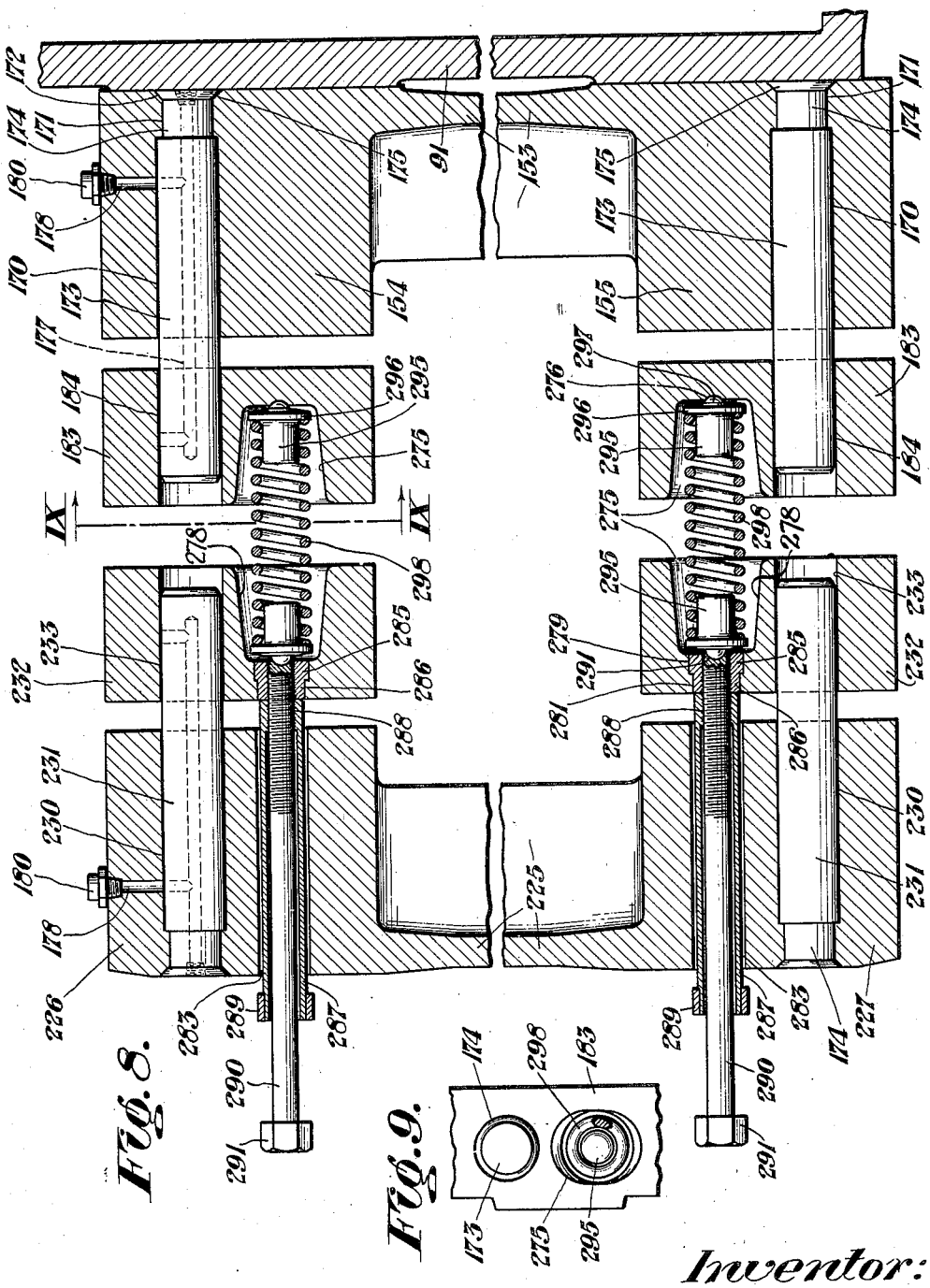

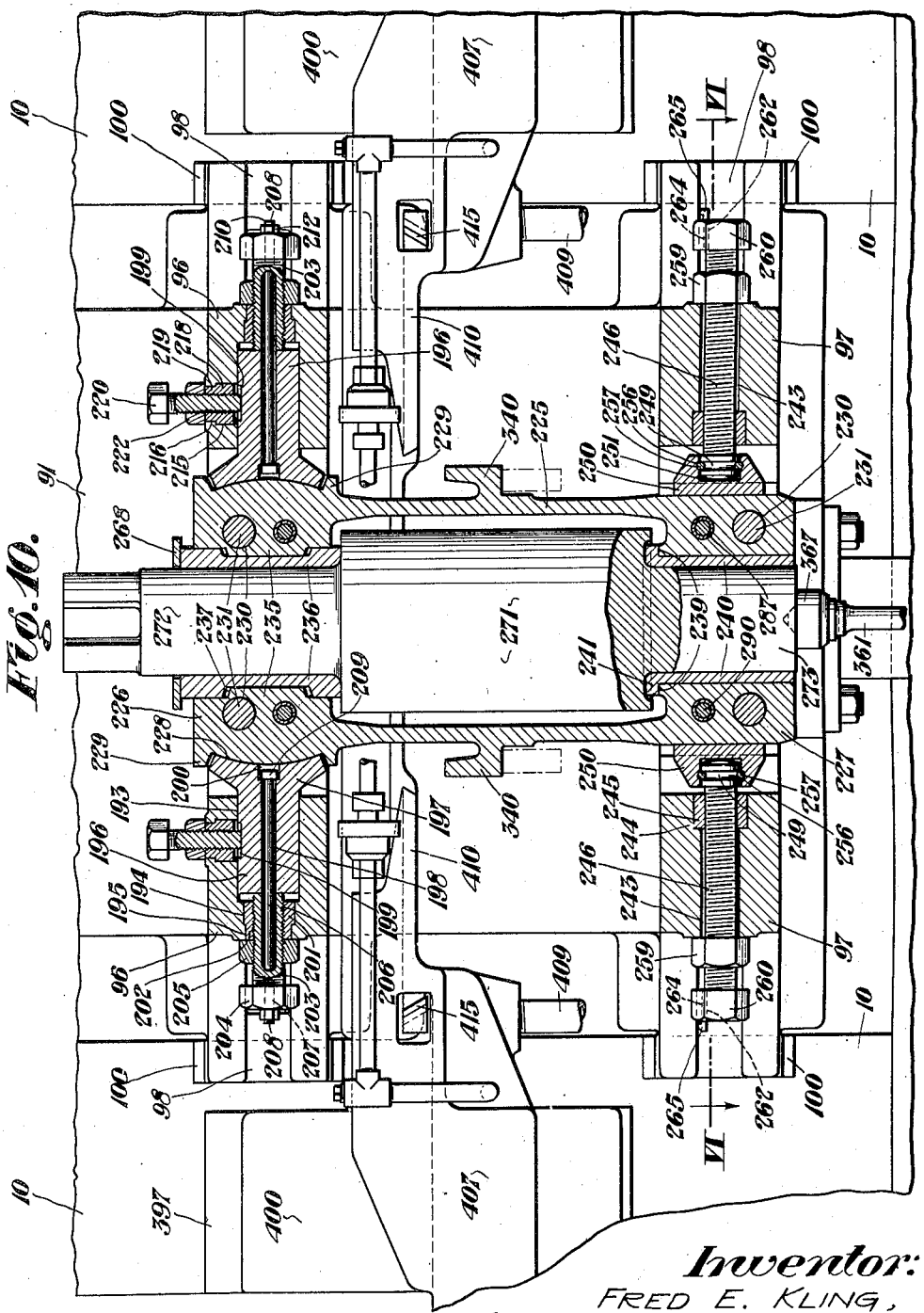

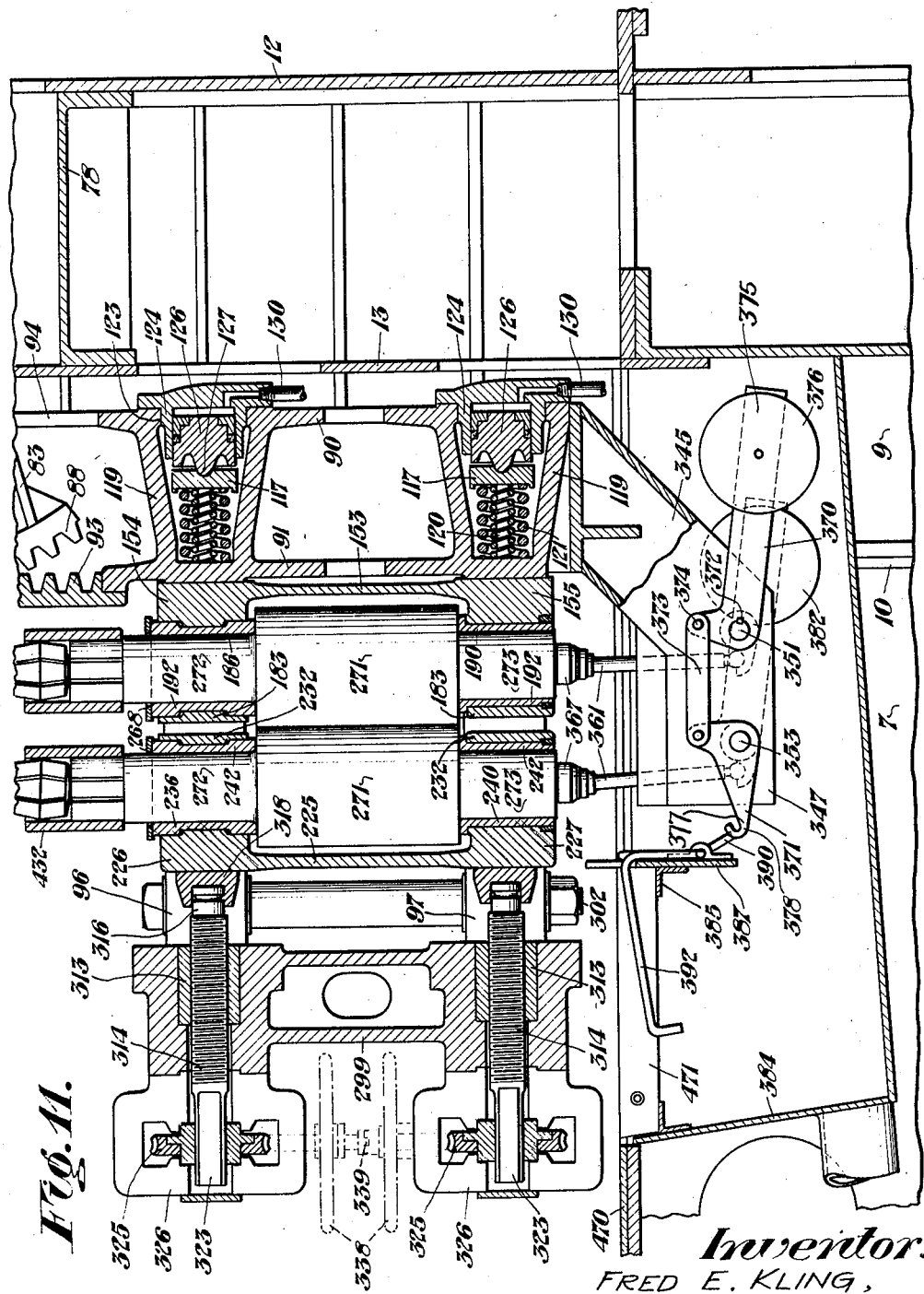

Aug. 4, 1936.  F. E. KLING  2,049,842
ROLLING MILL
Filed April 16, 1934   13 Sheets-Sheet 10
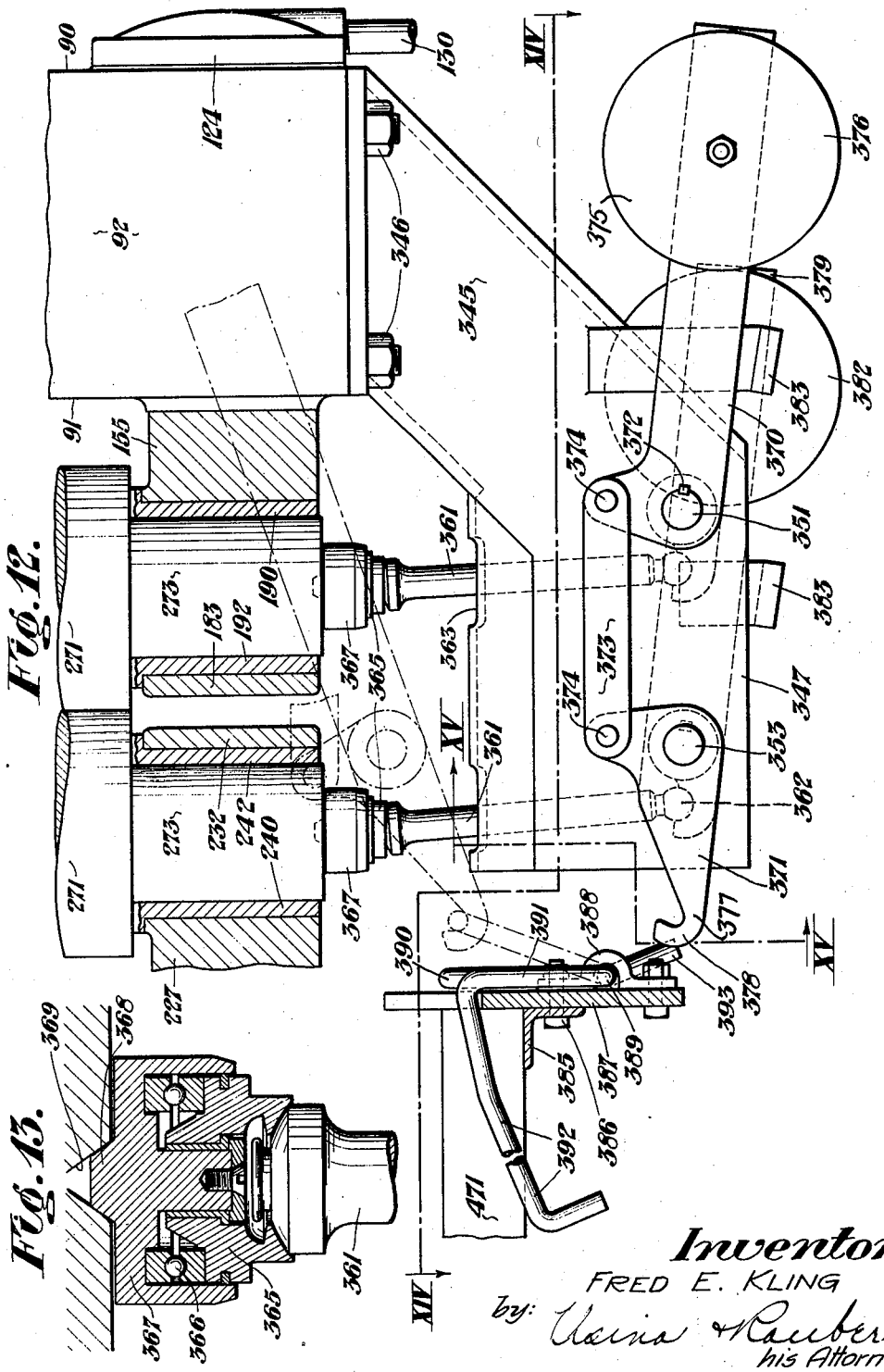
Inventor:
FRED E. KLING
by: Ueina & Rauber
his Attorneys.

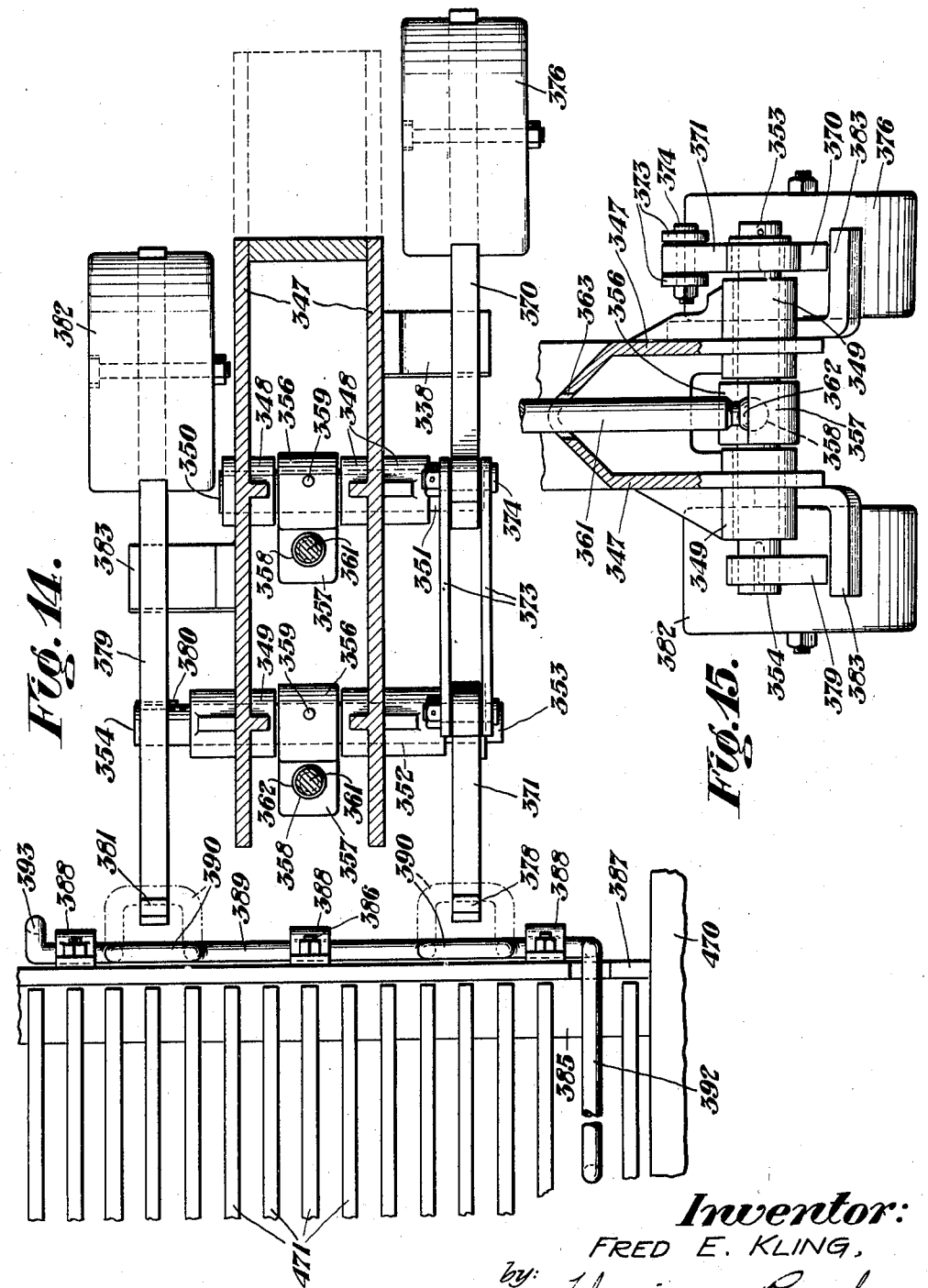

Aug. 4, 1936.  F. E. KLING  2,049,842
ROLLING MILL
Filed April 16, 1934  13 Sheets-Sheet 12

Inventor:
FRED E. KLING,
by: Usina & Lauber
his Attorneys.

Aug. 4, 1936.   F. E. KLING   2,049,842
ROLLING MILL
Filed April 16, 1934   13 Sheets-Sheet 13

Inventor:
FRED E. KLING,
by his Attorneys.

Patented Aug. 4, 1936

2,049,842

UNITED STATES PATENT OFFICE 2,049,842

ROLLING MILL

Fred E. Kling, Youngstown, Ohio

Application April 16, 1934, Serial No. 720,841

26 Claims. (Cl. 80—55)

This invention relates to rolling mills, and more particularly to those which are known as "continuous" rod, or bar, mills, although not limited thereto.

According to conventional practice, certain types of rolling mills employ metal working rolls disposed with their axes occupying substantially vertical planes. These "vertical stands", as they are known in the art, may in some instances constitute an entire series of consecutively arranged mills. In other forms of rolling mill practice, "vertical stands" of metal working rolls are alternately arranged with "horizontal stands", or metal working rolls disposed with their axes occupying substantially horizontal planes. In either case, "vertical stands" have, in the past, given rise to numerous difficulties. It has been necessary to dispose their pinion housings and other driving mechanisms in a pit below the level of the floor of the mill. These driving mechanisms must, of course, include bevel gears, or other transmission equipment involving considerable expense to install and maintain.

The water which is sprayed on the rolls and/or work-piece, and the scale accruing from the processing action, drop down into the bearings, gears, etc., and effect considerable damage. When it becomes necessary to make changes, or even slight adjustments, the operation of the entire mechanism of the mill must be discontinued and its elements dismantled, which, obviously, can only be done at tremendous expense.

In some types of rolling mills it is the practice to profile the bodies of the cooperating metal working rolls to provide several passes. This may be for the purpose of accommodating several sizes of work-piece, or a different cross-section without regard to size. On the other hand, the several passes may be identical, one merely being superseded for the other when wear is encountered. In this manner, frequent roll substitutions are obviated, whether for a change in size or cross-section of the pass, or for the purpose of redressing. The proper passes in the several groups of cooperating metal working rolls should, of course, be in alinement. This is particularly true of "continuous" mills in which the work-piece being processed is in several stands of rolls at the same time.

It is one of the objects of the present invention to provide a novel rolling mill, employing vertical stands of rolls, together with a prime mover and transmission mechanism which are both disposed entirely above the line of pass of the mill, and which are therefore immune to the evils of water and mill scale.

Another object is the provision of a novel rolling mill employing means for moving its various elements in such manner as to allow both vertical and horizontal adjustment of its line of pass or passes, which is a particularly important factor in mills of the "continuous" type.

A further object of the invention is to provide a rolling mill which is capable of the adjustments referred to in a very rapid manner, and while it is in operation, if such should prove desirable.

A still further object is the provision of a novel rolling mill employing means for moving its elements in the manner described, together with means for positively maintaining the same in the desired adjusted position.

A still further object is to provide a rolling mill of the type described which supports, from almost entirely one of its sides, an overhead prime mover and transmission mechanism, thus permitting free access to the elements of the mill from its remaining three sides for rapidly servicing the same.

A still further object is the provision of a rolling mill employing novel power transmitting means in lieu of the usual bevel gear drive, which is both costly and troublesome.

A still further object is to provide a rolling mill employing a vertically disposed metal working roll capable of vertical adjustment, together with a cooperating vertically disposed roll which may be adjusted universally about an axis coinciding with the point of intersection of its horizontal and vertical axes.

A still further object is the provision of a rolling mill having the foregoing advantages and one which is at the same time capable of withstanding extremely rough usage and service.

These and still further objects of the invention will be apparent after referring to the drawings, in which:

Figure 2 is a plan, partly in section, of the lower details of the apparatus.

Figure 3 is a view on the line III—III of Figure 2.

Figure 4 is a view on the line IV—IV of Figure 3.

Figure 5 is a plan shown partly in section.

Figure 7 is a sectional view on the line VII—VII of Figure 5.

Figure 8 is a view on the line VIII—VIII of Figure 5.

Figure 9 is a detailed view on the line IX—IX of Figure 8.

Figure 10 is a sectional elevation on the line X—X of Figure 5, and discloses the lower portion of the part of the apparatus from which Figure 6 is taken.

Figure 11 is a fragmentary sectional elevation.

Figure 12 is an enlarged fragmentary elevation, partly in section, of a detail.

Figure 13 is an enlarged fragmentary elevation, partly in section, of a part of the detail of Figure 12.

Figure 14 is a sectional plan on the line XIV—XIV of Figure 12.

Figure 15 is a view on the line XV—XV of Figure 12.

Figure 1:
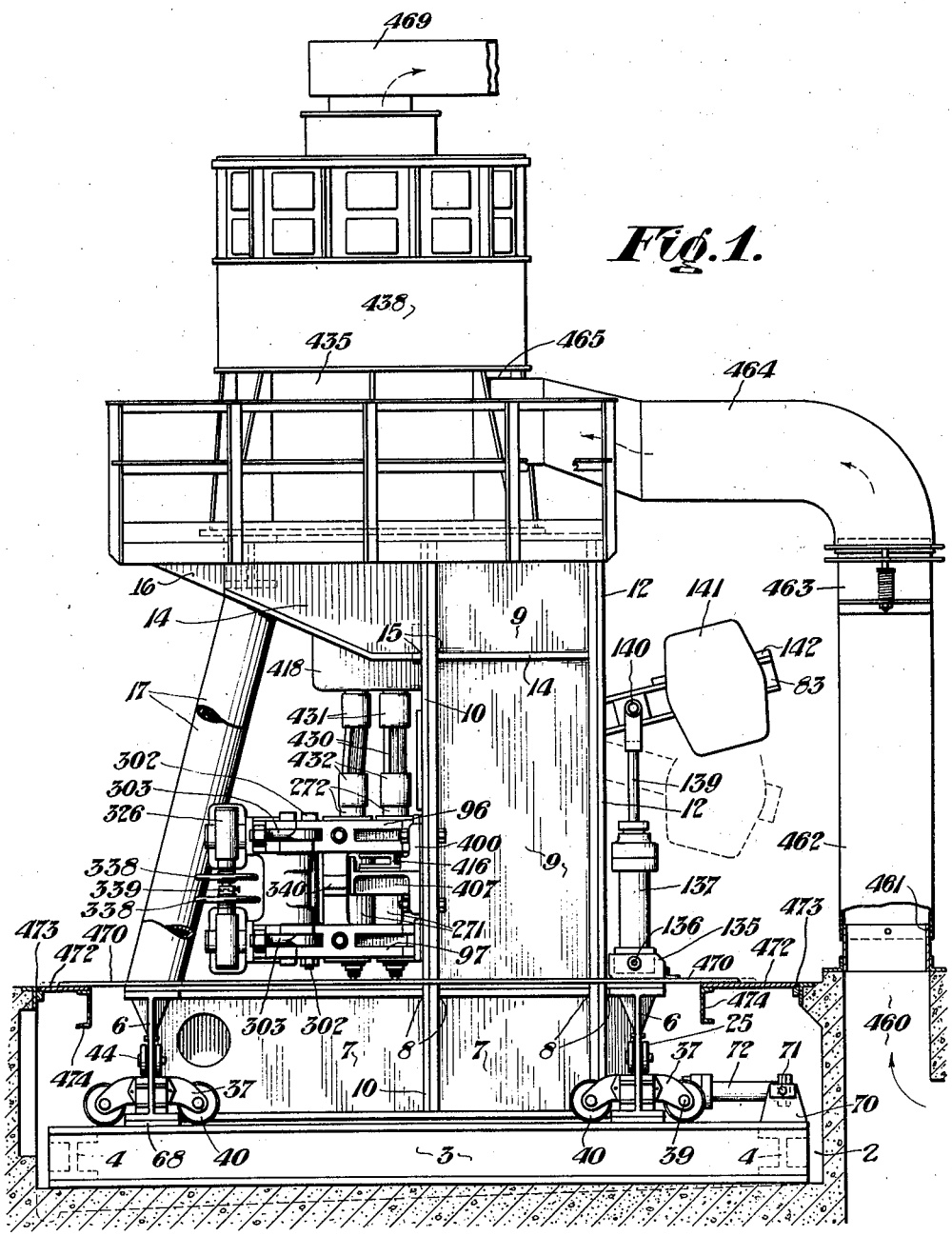
Figure 1 is an end elevation of the apparatus of the invention.
Figure 6:
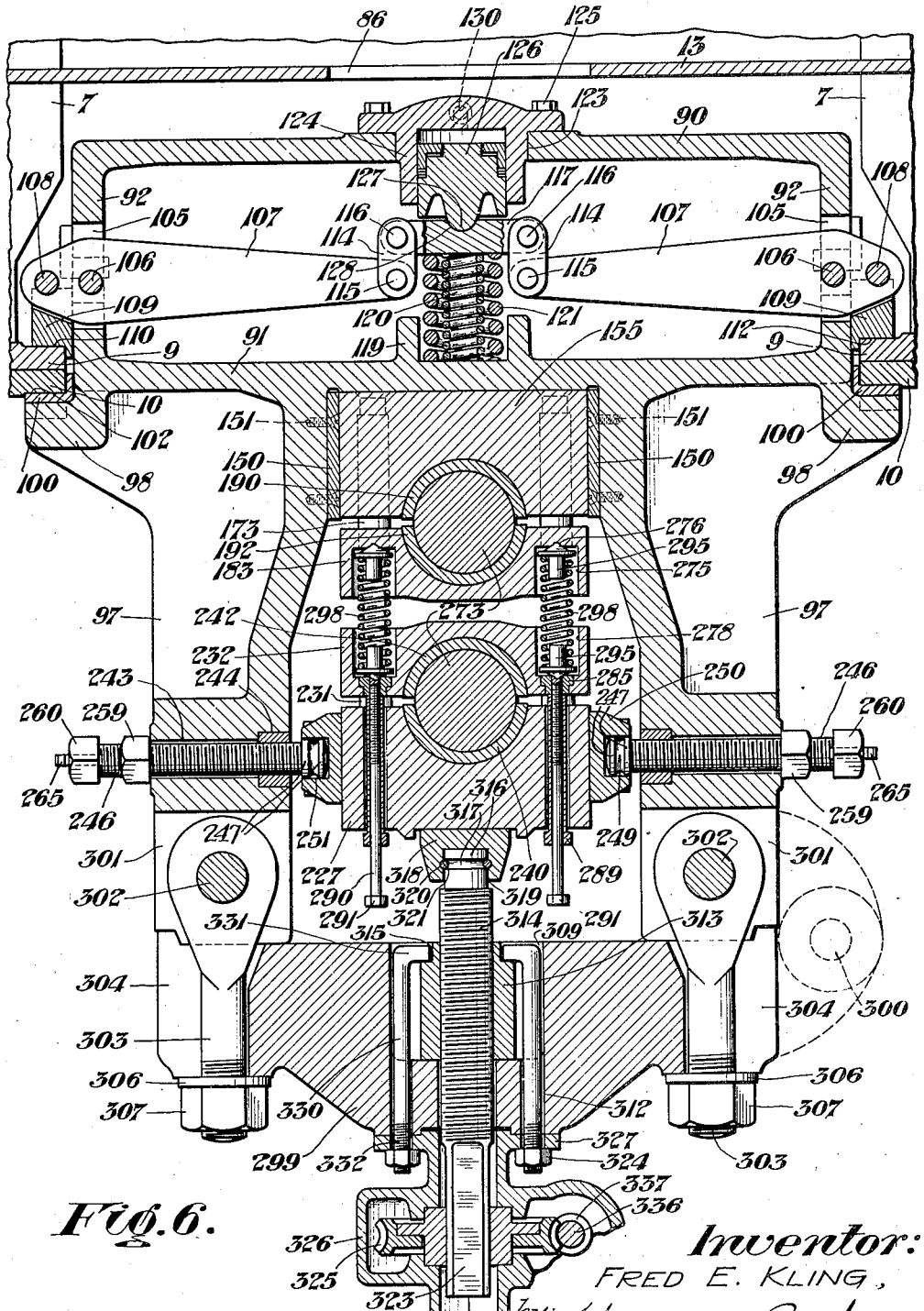
Figure 6 is a sectional plan on the line VI—VI of Figure 10.
Figure 16:
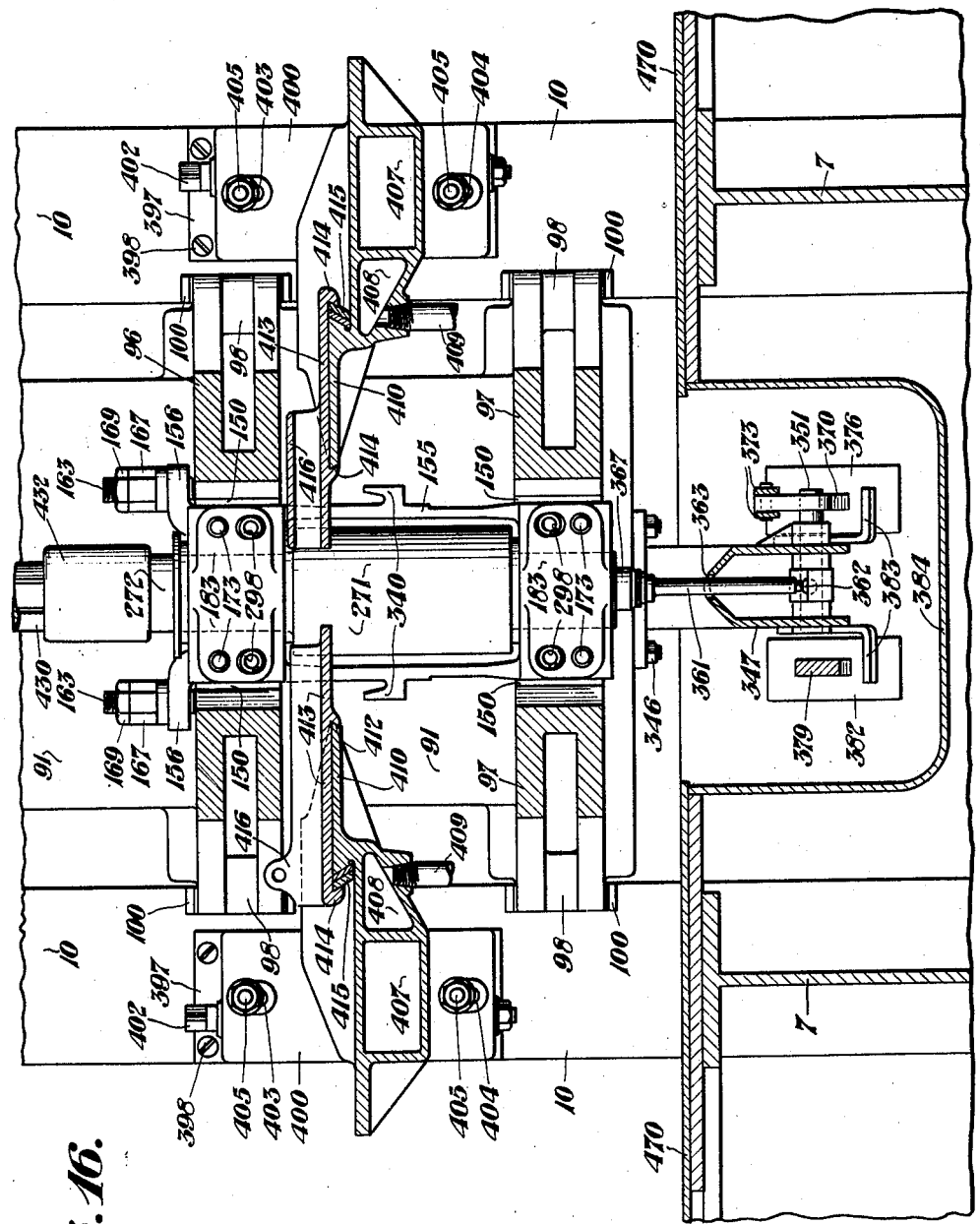
Figure 16 is a sectional elevation on the line XVI—XVI of Figure 5.

Referring more particularly to the drawings, the numeral 2 designates a pit in which it is desired to mount the apparatus of the invention. While it is understood that the rolling mill of the invention may be readily adaptable to process a work-piece of any cross-section, it is shown in the drawings as having been embodied in a single "vertical stand" of a "continuous" bar mill.

A pair of spaced I-beams 3 are disposed in the pit 2 at right angles to the line of pass of the "continuous" bar mill of which the apparatus is a part. The I-beams 3 are preferably of very substantial size and weight, and are maintained in spaced relationship by means of connecting I-beams 4, which may be secured to the former in any suitable manner as, for instance, by welding.

One of the novel features of the invention is a truck which is adapted for movement on the I-beams 3, and which comprises, in part, a base portion composed of a pair of very large I-beams 6, which are disposed on the I-beams 3 in spaced right-angular relationship, and are so maintained by a pair of interconnecting I-beams 7, which are secured thereto, preferably by welding.

The interconnecting I-beams 7 are notched on their webs and upper flanges adjacent one of their ends, as shown at 8. An I-beam 9 is vertically disposed on the inner side of each of the I-beams 7 in interlocking engagement with their notched portions 8, and are connected thereto by welding. A facing strip 10 is suitably secured to the outer side of the inner flange of each of the I-beams 9, and each extends downwardly into one of the notches 8. A plate 12 is suitably secured to and between the outer sides of the outer flanges of the I-beams 9, and extends downwardly into the other of the notches 8. The facing strips 10 and plate 12 are suitably welded to the I-beams 7 and 9. A plate 13 is vertically disposed between and in welded contact with the webs of the I-beams 9.

A pair of cantilever I-beams 14 are notched, as at 15, and each horizontally disposed on the inner side of and in interlocking engagement with one of the I-beams 9 and facing strips 10. The cantilever I-beams 14 are welded to the plate 12 and I-beams 9 from which they extend laterally outward, and are tapered on their overhung ends, as at 16. An outboard support, or stanchion, 17 is connected to and between each of the tapered ends 16, of cantilever I-beams 14, and one end of the upper flange of the I-beam 6 which is remote from the vertical I-beams 9.

The webs of both of the I-beams 6 of the base of the truck are thickened, or reenforced, adjacent their ends as at 20. These thickened, or reenforced portions 20 may be integrally formed or, if desired, made separately and attached thereto, and are apertured as at 21. Each of the apertures 21 is provided with a communicating vertically extending recess 22 in the webs of the flanges of the I-beams 6. A lever 25 is pivoted, as at 26, adjacent one of its ends to both sides of both ends of both of the I-beams 6. These levers 25 extend along the longitudinal axes of the beams with the extremities of their pivoted ends extending over the recesses 22. The opposite ends of each pair of levers 25 almost meet at the centers of the sides of the webs of the I-beams 6. A cylinder 28 is provided at this point on both of these beams, and each retains a pair of telescoped helical springs 29 and 30. A rod 31 is extended through each pair of helical springs 29 and 30 and both ends of one of the cylinders 28.

An aperture 32 is made through the webs of the I-beams 6 above each of the cylinders 28 to receive a cross-head 33, one of which is connected to the upper end of each of the rods 31. A downwardly extending link 34 is pivotally connected, as at 35, to each side of each of the cross-heads 33. A pair of pins 36, extending through the aperture 32, pivotally connect the adjacent inwardly extending ends of the levers 25 on opposite sides of the I-beams 6 to the lower ends of the links 34.

An inverted channel 37 is extended through each of the apertures 20 in the webs of the I-beams 6 and each carries on both of its sides a detachable guide plate 38. Each of the inverted channels 37 carries a shaft 39 on both of its ends which antifrictionally supports a caster 40. An upwardly extending lug 42 is provided on the center of the top of each of the inverted channels 37 and extends into one of the recesses 22. Each of the lugs 42 is centrally apertured, as at 43. A pivot pin 44 is extended through each of the apertures 43 to connect the adjacent extremities of the pivoted ends of the levers 25 on opposite sides of the I-beams 6.

A pair of clevises 46 are extended downwardly from the bottom flanges of both of the I-beams 6, one adjacent each of their ends. A lever 47 is pivoted adjacent one of its ends, as shown at 48, to each of the downwardly extending clevises 46. The extremities of the pivoted ends of the levers 47 extend beneath the under sides of the inner portions of the top flanges of the I-beams 3 upon which the I-beams 6 are disposed, and each carries a block 50 which is pivoted thereto, as at 51. The side of each of the blocks 50 which is remote from its pivots 51 is machined and undercut as at 53, while the adjacent portions of the top flanges of the I-beams 3 are machined, as at 54. The opposite ends of the levers 47 extend inwardly beneath the bottom flanges of the I-beams 6 to positions adjacent the bottoms of the centrally disposed cylinders 28.

A cross-head 55 is connected to the lower end of each of the rods 31 and a downwardly extending link 56 pivotally connected, as at 57, to each of its sides. The adjacent ends of the levers 47 are pivotally connected, as at 59, to the lower ends of the downwardly extending links 56. A fluid cylinder 60 is suitably secured to the bottom flange of each of the I-beams 6 immediately below each of the cylinders 28. A piston 62 is disposed in each of the fluid cylinders 60, and each is provided on its outer surface with a stud 63 which seats in a recess 65 on the under side of the adjacent cross head 55. Fluid is supplied to and exhausted from each of the cylinders 60 through a conduit 67 which communicates with any suitable source of supply. A friction plate 68 is suitably secured to the under surfaces of the bottom flanges of the I-beams 6 immediately below each of the apertures 21.

When the elements previously described are at rest, the telescoped springs 29 and 30 force downwardly the lower cross-heads 55, which depresses the links 56 and moves the levers 47 about their pivots 48. This causes the contact blocks 50 in the pivoted ends of the levers 47 to engage the machined under surfaces 54 of the lower and inner surfaces of the top flanges of the I-beams 3. This action of the springs 29 and 30 lowers the upper cross-heads 33 which draw the links 34 downwardly and cause the levers 25 to move about their pivots 26 to raise the upwardly extending lugs 42 on the inverted channels 37 and thus withdraw the casters 40 from contact with the supper surfaces of the I-beams 3, which lowers the friction plate 68 into contact therewith, thus locking the truck against horizontal movement. When it is desired to move the truck, fluid is supplied to cylinders 60, which raises the pistons 62 and causes their studs 63 to raise the lower cross-heads 55, which lowers the pivoted ends of the levers 47 to disengage the blocks 50 from contact with the machined under surfaces 54 of the I-beams 3.

At the same time, the rods 31 are raised, raising with them the cross-heads 33 which rock the levers 25 to lower the inverted channels 37 carrying the casters 40. The casters 40 are thus made to contact with the upper surfaces of the I-beams 3, and raise the mill to permit movement thereof.

One of the reenforcing I-beams 4, which maintain the I-beams 3 in spaced relationship, is provided adjacent each of its ends with a pair of supports 70, each pair of which carries a horizontal shaft 71. A fluid cylinder 72 is pivotally mounted on each of the shafts 71, and is each provided with the usual piston rod 73 which is pivotally connected, as at 75, to one of the I-beams 6. Fluid is supplied from a suitable source to each of the cylinders 72 to move their piston rods 73 in either direction, and thus move the truck.

A plurality of suitably profiled I-beams 78 are turned at right angles and disposed between, and in welded engagement with, the webs of the vertically extending I-beams 9. An inverted channel 80 is also disposed between the webs of the I-beams 9, while supported by one of the I-beams 78, and is preferably welded to all of these elements. The channel 80 carries on its upper surface a reenforced extension 81 which supports a shaft 82 on its upper end. A lever 83 is connected to the shaft 82 and extends through suitable openings 85 and 86 in the plates 12 and 13, respectively. The end of the lever 83 which extends through the plate 13 carries a curved rack 88 on its extremity.

The novel roll support of the mill of the invention comprises, in general, a vertically adjustable carriage which is composed, in part of a pair of relatively elongated vertically extending plates 90 and 91 which are connected by end plates 92. A rack 93 is secured to the plate 91 of the vertically adjustable carriage and is adapted to cooperate with the curved rack 88 on the lever 83, which extends through an aperture 94 in the plate 90.

The plate 91 is provided with upper and lower pairs of laterally extending arms 96 and 97, respectively, for a purpose to be later described. The plate 91 is also provided, on both of its vertical edges, with a guiding lug 98 adjacent the outer surface of the inner edge of one of the facing strips 10 for the flanges of the vertical I-beams 9. These guiding lugs 98 are each provided with an L-shaped friction lining 100 which is adapted to make contact with the edge of one of the facing strips 10, each of the latter being cooperatively machined, as at 102.

The end plates 92 of the vertically adjustable carriage are each provided with an upper and lower aperture 105. A pivot pin 106 is carried in each of the apertures 105 for pivotally supporting a lever 107 adjacent one of its ends. The levers 107 extend outwardly through the apertures 105 with their extremities in close proximity to the inner sides of the adjacent flanges of the I-beams 9. A pin 108 is carried on the extremity of the pivoted end of each of the levers 107 for supporting a clamping block 109 which is machined and undercut, as at 110, to cooperate with the inner surfaces of the flanges of the I-beams 9 which are also machined, as at 112.

The opposite ends of each pair of levers 107 extend inwardly to terminate adjacent each other at the approximate upper and lower centers of the vertically adjustable carriage. A laterally extending link 114 is pivoted, as at 115, to the adjacent ends of each of the levers 107, and each pair of these links provided with a pin 116 which is connected to one side of a cross-head 117. Each of the cross-heads 117 is adapted for sliding movement in a substantially cylindrical shell 119, the latter being formed between the plates 90 and 91 of the vertically adjustable carriage. A pair of telescoped springs 120 and 121 is disposed in each of the shells 119 and in contact with one of the sides of one of the cross-heads 117. The outer ends of the substantially cylindrical shells 119 are open, as at 123, in order that each may receive a fluid cylinder 124. The fluid cylinders 124 are secured in position by capscrews 125 and each provided with a piston 126. Each of the pistons 126 is provided on its outer surface with a stud 127 which seats in a recess 128 in the adjacent side of one of the cross-heads 117. Fluid is supplied to and exhausted from each of the cylinders 124 through a conduit 130 which communicates with any suitable source of supply.

A pair of supports 135 is mounted on one of the I-beams 6 immediately below the lever 83 and carries a shaft 136 to which there is pivotally connected a fluid cylinder 137. The fluid cylinder 137 is provided with an upwardly extending piston rod 139 which is pivoted, as at 140, to the lever 83. Fluid is supplied to and exhausted from the cylinder 137 by any suitable means. A counterweight 141 is mounted on the end of the lever 83 which is remote from that carrying the curved rack 88 for exerting an opposing influence to the piston rod 139, and is suitably adjusted by means of wedges 142.

In operating the vertically adjustable carriage, a suitable fluid is supplied through the conduits 130 to the fluid cylinders 124. This moves the fluid cylinder pistons 126 outwardly, which transmits the movement to the crossheads 117 which move the levers 107 about their pivots 106 to withdraw the clamping blocks 109 from the machined edges 112 of the inner surfaces of the flanges of the I-beams 9. The fluid cylinder 137 is next supplied with fluid to raise the piston rod 139, if it is desired to move the vertically adjustable carriage downwardly; or conversely, fluid may be exhausted therefrom to permit the counterweight 141 to rock the lever 83 to move the carriage upwardly, as the case may be. After the adjustment has been effected, the fluid is exhausted from the cylinders 124, which permits the telescoped springs 120 and 121 to move the fluid pistons 126 inwardly and cause the cross-heads 117 to move the levers 107. This last movement causes the clamping blocks 109 and the friction shoes 100 to effectively grip the machined edges 112 of the flanges of the I-beams 9 and the machined surfaces 102 of the facing strips 10, respectively.

The laterally extending arms 96 of the vertically adjustable carriage are each provided with a vertical aperture 145 adjacent their inner sides and the plate 91. Each of the arms 96 and 97 is provided on its inner side adjacent the plate 91 with a wear-plate 150 which is secured in position by means of countersunk screws 151. A segmental bearing support 153 is disposed between the plates 150 on the arms 96 and 97 and provides upper and lower segmental bearing bodies 154 and 155, respectively.

The upper extremity of the segmental bearing body 154 is provided with laterally extending lugs 156, which extend over the upper and inner edges of the arms 96 and which are vertically apertured, as at 158. A thimble 159 is screw-threaded in each of the apertures 158, and each provided on its upper extremity with an enlarged portion 160 with angular surfaces for accommodating a wrench for the purposes of adjusting the vertical disposition of the segmental bearing support 153 against the upper surfaces of the arms 96. The screw-threaded thimbles 159 are centrally apertured, as at 162, to accommodate a vertically extending bolt 163 which extends upwardly through an alined aperture 164 in each of the arms 96. The heads of the bolts 163 seat in suitable recesses 165 in the under sides of the arms 96 while their threaded extremities 166 extend upwardly out of the apertures 162 of the screw-threaded thimbles 159. A cap 167 is provided for each of the thimbles 159 and are each apertured as at 168 to receive one of the bolts 163 which extends therethrough. A nut 169 is provided for the threaded extremity 166 of each of the bolts 163 and serves to clamp the thimbles 159 against the upper surfaces of the arms 96. The vertical disposition of the segmental bearing support 153 may be readily adjusted by rotation of the thimbles 159 in the apertures 158 in the laterally extending lugs 156.

The segmental bearing bodies 154 and 155 are aperturned adjacent each of their sides, as at 170, these apertures being reduced in diameter, as at 171, adjacent to the plate 91 of the vertical adjustable carriage and flared, as at 172, on their ends. A pin 173 is adapted to seat in each of the apertures 170 and to extend from their ends which are remote from the plate 91. These pins 173 are reduced, as at 174, to seat in the reduced portions 171 of the apertures. The outer ends of the reduced portions 174 of each of the pins 173 are upset, as at 175, to seat in the flared openings 172 of the reduced portions 171 of the apertures 170. The pins 173 are thus held against movement out of the segmental bearing bodies 154 and 155.

Each of the pins 173 is bored, as at 177, to provide for distribution of a suitable lubricant which may be admitted through an aperture 178 in the upper surfaces of the segmental bearing body 154. The oil apertures 178 are each provided with a screw-threaded filler cap 180. The pin structure in the segmental bearing body 155 is identical with that of the segmental bearing body 154, except that the various oil bores and apertures are not disclosed in the drawings, for the sake of simplicity. An individual cooperating segmental bearing body 183 is provided for each of the segmental bearing bodies 154 and 155, and are each apertured, as at 184, to receive the extended ends of the pins 173.

The inner side of the upper segmental bearing body 154 carries an inwardly extending rib 185. An antifriction bearing segment 186 is adapted to be supported by the segmental bearing body 154 and has a recess 187 in its outer side to receive the inwardly extending rib 185. The bearing segment 186 may be adjusted vertically by means of suitable adjustments 188.

The upper end of the inner side of the lower segmental bearing body 155 is provided with an upwardly extending rib 189. An antifriction bearing segment 190 is adapted to be supported by the segmental bearing body 155 by way of having an outwardly extending lip 191 on the outer surface of its upper end, which rests on the upwardly extending rib 189.

An antifriction bearing segment 192 is suitably secured to each of the cooperating segmental bearing bodies 183 for the upper and lower segmental bearing bodies 154 and 155, respectively.

The upper laterally extending arms 96 on the plate 91 of the vertically adjustable carriage are each provided with an aperture 193 which extends inwardly therethrough. Each of the apertures 193 is reduced in diameter adjacent its outer end, as at 194, and further reduced on its extreme outer end, as at 195.

A sleeve 196 is disposed in each of the apertures 193 and each provided on its adjacent end with an enlarged, vertically concaved head 197. Each of the sleeves 196 is centrally apertured, as at 198, and provided on its upper surface with a slot 199. The concaved heads 197 of the sleeves 196 are each recessed in communication with the apertures 198, as shown at 200. An internally screw-threaded thimble 201 is disposed in the reduced portion 194 of each of the apertures 193 and each provided with a reduced portion 202 which seats in the further reduced portion 195 thereof. A bolt 203 is screw-threaded in each of the internally screw-threaded thimbles 201, and each provided on its outer end with the usual bolt-head 204. A lock-nut 205 is provided on each of the bolts 203 for locking the same in adjusted position. The shank of each of the bolts 203 is centrally apertured as at 206, and extends through their heads 204 as shown at 207. A bolt 208 is extended through the apertures 206 and 207 in the shank and head, respectively, of each of the bolts 203, and are each provided with a head 209 which seats in the communicating recess 200 in its concaved head 197.

The threaded ends 210 of the bolts 208 extend through the apertures 206 in the nuts 203, and are each provided with a nut 212. The upper surface of each of the arms 96 is apertured as at 215 immediately above the slots 199 in the sleeves 196. The diameter of each of the apertures 215 is reduced adjacent its upper end, as shown at 216. An internally screw-threaded thimble 218 is disposed in each of the apertures 215 and each has a reduced portion 219 which seats in the reduced portion 216 thereof. A capscrew 220 is screw-threaded in each of the thimbles 218, and each carries a lock-nut 222.

A segmental bearing support 225 is adapted to be supported by the laterally extending arms 96 of the vertically adjustable carriage, and provides upper and lower segmental bearing bodies 226 and 227, respectively. The upper segmental bearing body 226 is provided on both of its sides with a vertically convexed surface 228, the upper and lower limits of which terminate with laterally extending lips 229. The enlarged vertically concaved heads 197 of the sleeves 196 are adapted to make contact with the vertically convexed surfaces 228 of the sides of the upper segmental bearing body 226 to maintain the segmental bearing support 225 against vertical movement.

The segmental bearing bodies 226 and 227 of the segmental bearing support 225 are apertured adjacent each of their sides, as at 230, in a manner exactly identical with the apertures 170 in the segmental bearing bodies 154 and 155 of the segmental bearing support 154. A pin 231 is adapted to seat in each of the apertures 230 and to extend from their ends adjacent the cooperating segmental bearing bodies 183, these pins and their manner of mounting being exactly identical with the pins 173.

An individual cooperating segmental bearing body 232 is provided for each of the segmental bearing bodies 226 and 227, and are each apertured, as at 233, to receive the extended ends of the pins 231.

The inner surface of the upper segmental bearing body 226 is provided with an inwardly extending rib 235. An antifriction bearing segment 236 is adapted to be supported by the upper segmental bearing body 226 and has a recess 237 in its outer side to receive the inwardly extending rib 235.

The upper end of the inner side of the lower segmental bearing body 227 is provided with an upwardly extending rib 239. An antifriction bearing segment 240 is adapted to be supported by the segmental bearing body 227 by way of having an outwardly extending lip 241 on the outer surface of the upper end which rests on the upwardly extending rib 238.

An antifriction bearing segment 242 is suitably secured to each of the cooperating segmental bearing bodies 232 for the upper and lower segmental bearing bodies 226 and 227, respectively.

The lower laterally extending arms 97 of the vertically adjustable carriage are each provided with an aperture 243 which extends inwardly therethrough. The inner side of each of the arms 97 is provided with a recess 244 in communication with one of the apertures 243. An internally threaded nut 245 is disposed in each of the recesses 244 for accommodating a screw 246 which extends inwardly therefrom on one of its ends and provided with a machined extremity 247, which is annularly grooved, as at 249. A block 250 is adapted to be carried by the adjacent ends of each of the screws 246 and are each provided with a recess 251 in which the machined extremities 247 thereof seat. The recess 251 of each of the blocks 250 is grooved, as at 256, to partially accommodate a pair of pins 257, part of which also seat in the adjacent groove 249 of the screw.

A lock-nut 259 is screw-threaded on the outer end of each of the screws 246. The outer extremity of each of the screws 246 carries an adjusting nut 260, which is screw-threaded thereon. A keyway 262 is provided in the outer end of each of the screws 246, and a similar keyway 264 in the inner surface of each of the adjusting nuts 260. A key 265 is adapted to seat in the keyways 262 and 264. This construction permits the blocks 250 to be attached to the inner extremities of the screws 246, and the opposite end of the screws to be threaded through the nuts 245, apertures 243 and locknuts 259. The nuts 260 are then threaded on the opposite extremities of the screws 246, and the keys 265 placed in the keyways 262 and 264. The blocks 250 may then be adjusted relative to each other by the rotation of the nuts 260, which are locked upon the screws 246, to rigidly hold the lower segmental bearing body 227 of the segmental bearing support 225 in proper position.

A ring segment 268 is provided for the upper end of each of the bearing segments 186 and 192, and 236 and 242, for the upper roll necks 272, of the metal working rolls 271. These ring segments 268 serve to exclude dirt, etc., from the various bearing surfaces.

A pair of metal working rolls 271 are adapted to be disposed with their upper and lower roll necks 272 and 273, respectively, between the antifriction bearing segments of the various segmental bearing bodies and their cooperating segmental bearing bodies. These metal working rolls 271 are shown in the drawings as being perfectly cylindrical, but it is to be understood that they may be suitably profiled to process a work-piece having any cross-section, in accordance with conventional practice.

In order to maintain the cooperating segmental bearing bodies 183 and 232 against the segmental bearing bodies 154 and 155 of the segmental bearing support 153, and the segmental bearing bodies 226 and 227 of the segmental bearing support 225, respectively, a novel spring-tensioned means is provided.

According to this teaching of the invention, the cooperating segmental bearing bodies 183 are recessed as at 275, and provided on the centers of the bottoms thereof with a small conical recess 276. A corresponding recess 278 is made in each of the cooperating segmental bearing bodies 232. Each of the recesses 278 is provided on the center of its bottom with a communicating smaller recess 279. Each of the recesses 279 is reduced in diameter and extended out of the other side of the cooperating segmental bearing bodies 268, as shown at 281.

The upper and lower segmental bearing bodies 226 and 227 of the segmental bearing support 225 are apertured in alinement with the apertures 281 previously described, as shown at 283. An internally screw-threaded thimble 285 is disposed in each of the recesses 279 and are each provided with an extension 286 of reduced diameter which seats in the reduced portion 281 thereof. A sleeve 287 is disposed in each of the apertures 283 in the segmental bearing bodies 226 and 227. Each of the sleeves 287 extends from its aperture 283 and makes contact with the extension 286 of one of the screw-threaded thimbles 285. This end of each of the sleeves 287 is upset and internally screw-threaded in alinement with the internal threads of the thimbles 285, as shown at 288. The opposite end of each of the sleeves 287 extends from the other end of the aperture 283 and carries a nut 289 on its extremity.

A bolt 290 is adapted to extend through each of the sleeves 287 in screw-threaded engagement with its upset portion 288, and through and in screw-threaded engagement with one of the thimbles 285. This end of each of the bolts 290 is provided with a concave recess 291. A small buffer 295 is provided for each of the various recesses 275 and 278, of the cooperating segmental bearing bodies 183 and 232, respectively. Each of the buffers 295 is provided on one of its ends with an annular head 296 on the center of which there is a substantially convex stud 297, which is adapted to seat in one of the concave recesses 276 and 291, of the cooperating segmental bearing bodies 183, and the inner ends of the bolts 290, respectively. The other ends of each of the buffers 295 are adapted to be inserted in one end of a helical spring 298, one of which is disposed in and between each of the recesses 275 and 278.

The rotation of the bolts 290 regulates the spring-tensioning of the cooperating segmental bearing bodies 183 and 232 against the segmental bearing bodies 154 and 155 of the segmental bearing support 153, and the segmental bearing bodies 226 and 227 of the segmental bearing support 225, respectively.

A door 299 is pivoted, as at 300, to each of the arms 96 and 97 which extend laterally from the plate 91 of the vertically adjustable carriage. Each of the arms 96 and 97 is provided with a recess 301 in which there is disposed a vertical pivot pin 302. An eye bolt 303 is mounted on each of the pivots 302 and adapted to extend through recesses 304 in each side of the door 299. A washer and lock-nut 306 and 307, respectively, are inserted over the outer ends of each of the eye bolts 303 to lock the door 299 firmly against the arms 96 and 97.

The door 299 is provided with a pair of recesses 309 on its inner side and a smaller communicating aperture 310 which extends therefrom to the outer side thereof. The door 299 is further apertured, as at 312, on each side of the apertures 310. An internally threaded nut 313 is disposed in each of the recesses 309, and each carries a screw 314 which extends therethrough and through the communicating aperture 310. Each of the nuts 313 is provided on its end adjacent the inner side of the door 299 with a recess 315 on each of its sides.

The extremities of the ends of the screws 314 which extend through the nuts 313 are machined, as at 316, and provided with an annular groove 317. A block 318 is adapted to be carried by each of these ends of the screws 314 and is provided with a recess 319 in which the machined extremities 316 thereof seat. The recess 319 of each of the blocks 318 is grooved, as at 320, to accommodate a pair of pins 321, part of which also seat in the adjacent groove 317 of the screw. The opposite end of each of the screws 314 extends from its aperture 310, and is provided with a shank 323 of angular cross-section. A worm gear 325 is disposed on each of the shanks 323 for rotation therewith, but are each capable of reciprocatory movement with respect thereto.

Each of the worm gears 325 is encased in a housing 326 which is provided with flanges 327 having apertures in alinement with the apertures 312 in the doors 299. A bolt 330 is extended through each of the apertures 312 and each carries on its inner end a laterally extending lug 331 which seats in one of the recesses 315 in the screws 313.

The opposite end of each of the bolts 330 is threaded, as at 332, and extended through one of the apertures in the flanges 327 of the housings 326. A nut 334 is threaded on the outer end of each of the bolts 330. A vertical shaft 336 is journaled in each of the housings 326 and provided on their ends remote from each other with a worm 337 for engagement with the worm gears 325. A hand-wheel 338 is secured to each of the opposite and adjacent ends of the vertical shafts 336. The hand-wheels 338 serve to regulate the "screw pressure" of the segmental bearing bodies 226 and 227, and are connected together by a coupling 339 for enabling their rotation in unison. The several screw adjustments applicable to the segmental bearing support 225 at its upper and lower segmental bearing bodies 226 and 227, respectively, permit it to be readily adjusted universally about an axis coinciding with the point of intersection of its horizontal and vertical axes.

The segmental bearing supports 153 and 225 are each provided on both of their sides with a lug 340 which may be engaged by crane forks inserted between the upper and lower arms 96 and 97 of the vertically adjustable carriage when the doors 299 are opened. This permits the metal working rolls 271 and their mountings to be rapidly removed.

A diagonal downward extension 345 is connected, as at 346, to the bottoms of the plates 90 and 91 of the vertically adjustable carriage. An inverted channel 347 is made to extend horizontally from, and is preferably formed integral with, the diagonal downward extension 345. This inverted channel 347 carries in its sides two pairs of alined journals, as shown at 348 and 349. A shaft 350 is mounted in the alined journals 348 and extended from one side thereof, as at 351. A shaft 352 is mounted in the alined journals 349 and made to extend from each side thereof, as shown at 353 and 354. A collar 356 is mounted on each of the shafts 350 and 352, at positions intermediate the sides of the inverted channel 347, and are each provided with an offset portion 357, having a socket 358 in its upper surface. The collars 356 are secured against rotation on the shafts 350 and 352 by means of pins 359.

A shaft 361 is provided for each of the collars 356 and each carries on its lower extremity a ball 362, which is adapted to seat in one of the sockets 358. The upper end of each of the shafts 361 extends through an aperture 363 in the top of the inverted channel 347, and each carries a universal joint 365 on its upper extremity. Each of the universal joints 365 supports a bearing 366 which in turn carries a rotary head 367. A conical stud 368 is provided on the center of the upper surface of each of the rotary heads 367. The lower extremity of each of the roll necks 273, of the rolls 271, is conically recessed as at 369 to receive one of the conical studs 368.

In order to effectively maintain the shafts 350 and 352 in a state of rotation such as will permit the shafts 361 to rigidly hold the rotary heads 367 against the lower extremities of the roll necks 273, the former are each provided on their extended ends, 351 and 353, respectively, with a bell-crank lever, as at 370 and 371. The bell-crank lever 370 is keyed against rotation on its extended shaft 351, as shown at 372. A link 373 is pivotally connected on both of its ends, as at 374, to one end of each of the bell-crank levers 370 and 371. The bell-crank lever 371 is provided on the other of its ends with an elongated extension 375 which carries an adjustable counterweight 376. The other end of the bell-crank lever 371 is provided with an extension 377 which carries on its outward extremity an upwardly extending hook 378. A lever 379 is keyed substantially intermediate its length, as shown at 380, to the extended end 354 of the shaft 352. This lever 379 extends substantially parallel on one of its ends with the extension 377 of the bell-crank lever 370, and is provided on its extremity with an upwardly extending hook 381.

The other end of the lever 379 extends substantially parallel with the extension 375 on the bell-crank lever 371, and carries an adjustable counterweight 382. The counterweighted ends of the lever 379 and the extension 375 on the bell-crank lever 371 are each restrained against excessive downward movement by a stop 383, one of which is secured to each side of the inverted channel 347.

A well-box 384 is suitably supported between the I-beams 7, outward I-beam 6 and vertically extending plate 13 of the horizontally movable truck. This well-box 384 is disposed directly beneath the vertically adjustable carriage which supports the metal working rolls 271, and carries a transverse angle 385 to which there is connected, as at 386, a strip 387. The strip 387 carries a plurality of horizontally alined journals 388. A rod 389 is mounted in the journals 388 and carries a pair of loops 390, each of which is adapted to be engaged by one of the upwardly extending hooks 381 and 378 on the lever 379, and the extension 377 of the bell-crank lever 370, respectively. An upward extension 391 is carried by one of the ends of the rod 389, and provided with a laterally extending lever 392, which is moved to disengage the loops 390 from the hooks 378 and 381. A downward extension 393 is carried by the other end of the rod 389 to limit its rotation.

Referring to Figure 5 of the drawings, a vertical strip 397 is bolted, as at 398, to each of the facing strips 10 on the outer sides of the inner flanges of the vertical I-beams 9. The strips 397 are each provided with a centrally disposed outwardly extending rib 399.

A plate 400 is provided for contacting each of the strips 397, and are each recessed, as at 401, to receive the outwardly extending ribs 399 thereof. These plates 400 are each provided with a vertical adjusting screw 402, and upper and lower apertures 403 and 404, respectively, through each of which there extends a bolt 405 which is secured to the strips 397 with which they are in contact. A nut 406 is threaded on the end of each of the bolts 405 to secure the plates 400 in the positions to which they have been adjusted by means of the vertical adjusting screws 402. A hollow table 407 is carried between each pair of plates 400, and each provided with a water-cooled passage 408 on their sides most adjacent the metal working rolls 271. A coolant is supplied from a suitable source to each of the water-cooled passages 408 through a pipe 409. An elevated and extended table 410 is carried on the extremity of each of the water-cooled passages 408, and each has its forward and rearward edges undercut, as at 412. A guide plate 413, composed of suitable wear-resistant material, is mounted on each of the elevated tables 410 by way of having undercut ribs 414 which cooperate with the undercut edges 412 thereof, wedges 415 being provided for procuring a snug fit. These guide plates 413 serve to effectively introduce the work-piece to be processed between the metal working rolls 271, and are each provided with sides 416 which conform substantially to the cross-section thereof.

A pinion housing 418 is mounted on the vertically adjustable carriage above the upper arms 96 which extend laterally from the plate 91, and is secured thereto in any suitable manner.

The pinion housing 418 is provided with upper and lower vertically alined antifriction bearings 419 and 420, respectively. The upper antifriction bearings 419 are retained in position by a retainer sleeve 421 which is secured to the pinion housing by capscrews 422, while the lower antifriction bearings 420 are each retained in a recess 423. The top of the pinion housing 418 is provided with a removable cover plate 424 for each of the bearings 419. Each of these removable cover plates 424 is secured to the retainer sleeve 421 by capscrews 425.

A pinion 427 is vertically and rotatably mounted with its upper and lower shafts 428 and 429, respectively, in each pair of the vertically alined antifriction bearings 419 and 420. The lower shaft 429 of each of the pinions 427 is elongated and connected to a shaft 430 by means of a coupling 431. Each of the shafts 430 is connected to the upper roll neck 272 of one of the metal working rolls 271 by a coupling 432.

Figure 17:
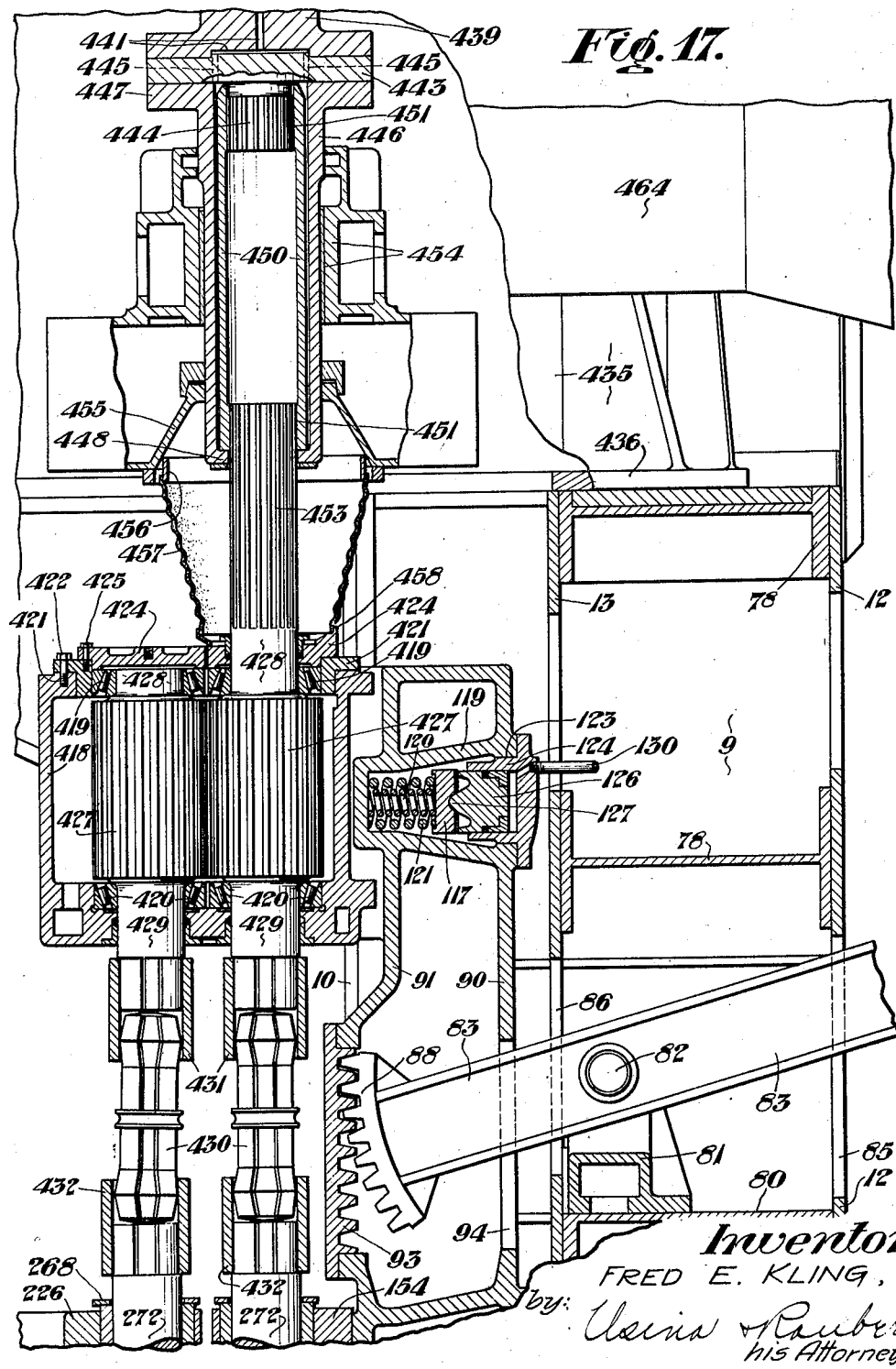
Figure 17 is an enlarged fragmentary sectional elevation of another part of the apparatus.

A motor base 435 is mounted on the upper portion of the horizontally movable truck by way of having its flange 436, as shown in Figure 17 connected to the upper flanges of the cantilever I-beams 14 in any suitable manner. A motor 438 is carried by the motor base 435 and provided with a drive shaft 439 which has been bored, as at 441, for the purpose of distributing a lubricant.

A coupling 443 is suitably connected to the drive-shaft 439 and carries an integrally formed centrally disposed downwardly extending splined stud 444. The splined stud 444 is lubricated through oil bores 445 in the coupling 443 which are in communication with the oil bores 441 in the drive-shaft 439. A sleeve 446 is provided with an outwardly extending flange 447 which is connected to the coupling 443 in any suitable manner.

This sleeve 446 is provided on its end opposite the outwardly extending flange 447 with an annular inwardly extending flange 448. An inner sleeve 450 is disposed within the sleeve 446 and provided with upset and internally splined ends 451, the upper of which telescopes over the splined stud 444 on the coupling 443. The upper shaft 428 of the pinion 427 which is nearest the plate 91 of the vertically adjustable carriage carries an elongated splined shaft 453, which is adapted to extend within the sleeves 446 and 450 to cooperate with the upset and internally splined end 451 of the latter.

A bearing 454 is provided for the intermediate portion of the sleeve 446, and is maintained in position by way of being suitably connected to the upper portion of the horizontally movable truck. A hub 455 is carried by the lower portion of the bearing 454 and supports, as at 456, a downwardly extending collapsible boot 457, which encloses the elongated splined shaft 453 on the upper shaft 428 of the pinion 427 which is nearest the plate 91 of the vertically adjustable carriage. The lower end of the downwardly extending collapsible boot 457 is connected to the top of one of the cover plates 424, as shown at 458.

An air duct 460 is provided in the foundation of the mill adjacent the pit 2 in which the apparatus of the invention is mounted. A sleeve 461 is connected to the outlet of the air duct 460. A vertically extending tube 462 is mounted on the sleeve 461 and provided on its upper end with a flexible connection 463 which supports an elbow 464. The elbow 464 is connected as at 465 to the motor base 435. Air is supplied from a suitable source to the air duct 460 and serves to cool the motor 438, from whence it is exhausted through an outlet tube 469.

A cover plate 470 is provided for the base of the horizontally movable truck, and rests upon the upper surfaces of the upper flanges of the I-beams 6 and 7. This cover plate 470 is suitably profiled to accommodate all of the elements of the apparatus which extend above it, and to permit of accessibility to the well-box 384, the latter being provided with a grill 471 for its exposed portions.

A supporting plate 472 is provided for each edge of the cover plate 470 and are each secured as at 473 to one edge of the pit 2 in the foundation of the mill and also to a supporting channel 474.

While I have shown and described one specific embodiment of my invention, it will be understood that I do not wish to be limited exactly thereto, since various modifications may be made without departing from the scope of my invention, as defined in the following claims.

I claim:

1. A rolling mill comprising a bed, a truck horizontally movable on said bed, a carriage mounted on said truck, a plurality of metal working rolls journaled in said carriage, a prime mover secured to the upper portion of said truck, a driving connection between said prime mover and said metal working rolls, means for moving said truck, and means for securing said truck to said bed, said last named means including at least one spring-pressed element for clamping said truck to said bed and fluid actuated means for relieving said spring-pressed element.

2. A rolling mill comprising a bed, a truck mounted on retractable casters and adapted for horizontal movement on said bed, a carriage mounted on said truck, a plurality of metal working rolls journaled in said carriage, a prime mover secured to the upper portion of said truck, a driving connection between said prime mover and said metal working rolls, means for moving said truck, means for securing said truck against movement, said last named means including at least one spring-pressed element for retracting said casters and clamping said truck to said bed, and fluid actuated means for relieving said spring-pressed element.

3. A rolling mill comprising a bed, a truck carrying a plurality of plates adapted to contact said bed, a carriage mounted on said truck, a plurality of metal working rolls journaled in said carriage, a prime mover secured to the upper portion of said truck, a driving connection between said prime mover and said metal working rolls, a pair of oppositely extending levers pivotally connected to said truck substantially above the plates carried thereby, at least one caster mounted on the remote end of each of said levers, a downwardly extending lug carried by said truck adjacent each of said casters, a pair of oppositely extending levers pivoted to said downwardly extending lugs, said last named pair of levers extending beneath portions of said bed, a block carried by the remote end of each of said last named levers, a link connecting the adjacent ends of each of said pairs of levers, a rod connecting said links, and means for moving said rod on its axis.

4. A rolling mill comprising a bed, a truck carrying a plurality of plates adapted to contact said bed, a carriage mounted on said truck, a plurality of metal working rolls journaled in said carriage, a prime mover secured to the upper portion of said truck, a driving connection between said prime mover and said metal working rolls, a pair of oppositely extending levers pivotally connected to said truck substantially above the plates carried thereby, at least one caster mounted on the remote end of each of said levers, a downwardly extending lug carried by said truck adjacent each of said casters, a pair of oppositely extending levers pivoted to said downwardly extending lugs, said last named pair of levers extending beneath portions of said bed, a block carried by the remote end of each of said last named levers, a link connecting the adjacent ends of each of said pairs of levers, a rod connecting said links, at least one spring means for axially moving said rod in one direction, and fluid actuated means for moving said rod in the opposite direction.

5. A rolling mill comprising a bed, a truck carrying a plurality of plates adapted to contact said bed, a carriage mounted on said truck, a plurality of metal working rolls journaled in said carriage, a prime mover secured to the upper portion of said truck, a driving connection between said prime mover and said metal working rolls, a pair of oppositely extending levers pivotally connected to said truck substantially above the plates carried thereby, at least one caster mounted on the remote end of each of said levers, a downwardly extending lug carried by said truck adjacent each of said casters, a pair of oppositely extending levers pivoted to said downwardly extending lugs, said last named pair of levers extending beneath portions of said bed, a block carried by the remote end of each of said last named levers, a link connecting the adjacent ends of each of said pairs of levers, at least one coil spring carried by said truck between said links, said spring being adapted to continuously contact one of said links, a rod extending through said coil spring and connected at each of its ends to one of said links, and means for compressing said spring.

6. A rolling mill comprising a horizontally movable truck, a vertically adjustable carriage mounted on said truck, a plurality of metal working rolls journaled in said carriage, a prime mover secured to the upper portion of said truck, a telescopic driving connection between said prime mover and said metal working rolls, means for moving said truck, means for securing said truck against movement, means for moving said carriage, means for securing said carriage in adjusted position, said last named means including spring-pressed elements for clamping said carriage to said truck, and means for relieving said spring-pressed elements.

7. A rolling mill comprising a bed, a truck horizontally movable on said bed, a vertically adjustable carriage mounted on said truck, a plurality of metal working rolls journaled in said carriage, a prime mover secured to the upper portion of said truck, a telescopic driving connection between said prime mover and said metal working rolls, means for moving said truck, at least one spring-pressed element for clamping said truck to said bed, means for relieving said spring-pressed element, means for moving said carriage, at least one spring-pressed element for clamping said carriage to said truck, and means for relieving said last named spring-pressed element.

8. A rolling mill comprising a bed, a truck mounted on retractable casters and adapted for horizontal movement on said bed, a vertically adjustable carriage mounted on said truck, a plurality of metal working rolls journaled in said carriage, a prime mover secured to the upper portion of said truck, a telescopic driving connection between said prime mover and said metal working rolls, means for moving said truck, at least one spring-pressed element for retracting said casters and clamping said truck to said bed, means for relieving said spring-pressed element, at least one spring-pressed element for clamping said carriage to said truck, and means for relieving said last named spring-pressed element.

9. A rolling mill comprising a horizontally movable truck, vertical guideways on said truck, a movable carriage mounted in said guideways, a plurality of metal working rolls journaled in said carriage, a prime mover secured to the upper portion of said truck, a telescopic driving connection between said prime mover and said metal working rolls, stationary blocks mounted on said carriage adjacent one of the sides of said vertical guideways on said truck, oppositely extending levers pivoted to said truck on the opposite sides of said vertical guideways, a block carried by the remote end of each of said levers, a link connecting the adjacent ends of said levers, and means for moving said link transversely of its axis in both directions.

10. A rolling mill comprising a horizontally movable truck, vertical guideways on said truck, a movable carriage mounted in said guideways, a plurality of metal working rolls journaled in said carriage, a prime mover secured to the upper portion of said truck, a telescopic driving connection between said prime mover and said metal working rolls, stationary blocks mounted on said carriage adjacent one of the sides of said vertical guideways on said truck, oppositely extending levers pivoted to said truck on the opposite sides of said vertical guideways, a block carried by the remote end of each of said levers, a link connecting the adjacent ends of said levers, at least one spring for moving said link transversely of its axis in one direction, and means for moving said link in the opposite direction.

11. A rolling mill comprising a horizontally movable truck, a vertically adjustable carriage mounted on said truck, a plurality of vertically disposed metal working rolls journaled in said carriage, a shaft journaled on said truck below each of said rolls, a socket secured to each of said shafts, a counterweighted lever connected to each of said shafts, a linkage connecting said shafts, at least one hook on one of said shafts, a loop carried by said truck for receiving said hook, a rod for each of said sockets, each of said rods being provided with a ball on one of its ends for seating therein, an antifriction bearing carried on the other end of each of said rods for supporting one of said vertically disposed metal working rolls, a prime mover secured to the upper portion of said truck, and a telescopic driving connection between said prime mover and said metal working rolls.

12. A rolling mill comprising a horizontally movable truck, a vertically adjustable carriage mounted on said truck, a plurality of vertically disposed metal working rolls journaled in said carriage, a shaft journaled on said truck below each of said rolls, a socket secured to each of said shafts, a counterweighted lever connected to each of said shafts, a linkage connecting said shafts, at least one hook on one of said shafts, a loop carried by said truck for receiving said hook, a rod for each of said sockets, each of said rods being provided with a ball on one of its ends for seating therein, an antifriction bearing carried on the other end of each of said rods for supporting one of said vertically disposed metal working rolls, a universal joint between each of said rods and each of said antifriction bearings, a prime mover secured to the upper portion of said truck, and a telescopic driving connection between said prime mover and said metal working rolls.

13. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, a prime mover secured to the upper portion of said truck, and a telescopic driving connection between said prime mover and said metal working rolls.

14. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, a prime mover secured to the upper portion of said truck, a plurality of pinions journaled in said carriage, a shaft connecting each of said pinions with one of said metal working rolls, said carriage having a port for permitting the removal of said metal working rolls, and a telescopic driving connection between said prime mover and at least one of said pinions.

15. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, a prime mover secured to the upper portion of said truck, a plurality of pinions journaled in said carriage, a shaft connecting each of said pinions with one of said metal working rolls, said carriage having a port for permitting the removal of said metal working rolls, a telescopic driving connection between said prime mover and at least one of said pinions, means for moving said truck, and means for holding said truck against movement.

16. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, a prime mover secured to the upper portion of said truck, a plurality of pinions journaled in said carriage, a shaft connecting each of said pinions with one of said metal working rolls, said carriage having a port for permitting the removal of said metal working rolls, a telescopic driving connection between said prime mover and at least one of said pinions, means for moving said truck, means for holding said truck against movement, means for moving said carriage, and means for maintaining said carriage in adjusted position.

17. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, means for adjusting the position of said first named pair of upper and lower bearing segments with respect to their cooperating bearing segments, a prime mover secured to the upper portion of said truck, and a telescopic driving connection between said prime mover and said metal working rolls.

18. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means for adjusting said spring, a plurality of metal working rolls rotatably mounted in the assemblies formed by said bearing segments, means for adjusting the position of said first named pair of upper and lower bearing segments with respect to their cooperating bearing segments, a prime mover secured to the upper portion of said truck, and a telescopic driving connection between said prime mover and said metal working rolls.

19. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, a plurality of metal working rolls rotatably mounted in the assemblies formed by said bearing segments, extraneous means for antifrictionally supporting said metal working rolls, means for adjusting the position of said first named pair of upper and lower bearing segments with respect to their cooperating bearing segments, a prime mover secured to the upper portion of said truck, and a telescopic driving connection between said prime mover and said metal working rolls.

20. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means on said carriage for adjusting the lateral disposition of said first named pair of upper and lower bearing segments means for adjusting the position of said first named pair of upper and lower bearing segments with respect to their cooperating bearing segments, a prime mover secured to the upper portion of said truck, and a telescopic driving connection between said prime mover and said metal working rolls.

21. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means on said carriage for adjusting the lateral disposition of said first named pair of upper and lower bearing segments, a removable plate on said carriage adjacent said first named pair of upper and lower bearing segments, said plate having at least one aperture, at least one clamping element connected to said removable plate, an internally threaded bushing maintained in alinement with the aperture in said plate by said clamping element, a screw extending through said aperture for adjusting the position of said first named pair of upper and lower bearing segments with respect to their cooperating bearing segments, a plurality of metal working rolls rotatably mounted in the assemblies formed by said bearing segments, and means for rotating said rolls.

22. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means on said carriage for adjusting the lateral disposition of said first named pair of upper and lower bearing segments, a removable plate on said carriage adjacent said first named pair of upper and lower bearing segments, said plate having at least one aperture, at least one clamping element connected to said removable plate, an internally threaded bushing maintained in alinement with the aperture in said plate by said clamping element, a screw extending through said aperture for adjusting the position of said first named pair of upper and lower bearing segments with respect to their cooperating bearing segments, a plurality of metal working rolls rotatably mounted in the assemblies formed by said bearing segments, extraneous means for antifrictionally supporting said metal working rolls, and means for rotating the same.

23. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means on said carriage for adjusting the lateral disposition of said first named pair of upper and lower bearing segments, a removable plate on said carriage adjacent said first named pair of upper and lower bearing segments, said plate having at least one aperture, at least one clamping element connected to said removable plate, an internally threaded bushing maintained in alinement with the aperture in said plate by said clamping element, a screw extending through said aperture for adjusting the position of said first named pair of upper and lower bearing segments with respect to their cooperating bearing segments, a plurality of metal working rolls rotatably mounted in the assemblies formed by said bearing segments, a prime mover secured to the upper portion of said truck, a telescopic driving connection between said prime mover and said metal working rolls, means for moving said vertically adjustable carriage, and means for securing the same in adjusted position.

24. A rolling mill comprising a horizontally movable truck, a vertically adjustable carriage mounted on said truck, at least one pair of upper and lower bearing segments supported by said carriage, a cooperating bearing segment for each of said first named bearing segments, at least one second pair of upper and lower bearing segments, a cooperating bearing segment for each of said second named pair of upper and lower bearing segments, at least one spring for maintaining adjacent cooperating bearing segments apart, means on said carriage for adjusting the lateral disposition of said first named pair of upper and lower bearing segments, a removable plate on said carriage adjacent said first named pair of upper and lower bearing segments, said plate having at least one aperture, at least one clamping element connected to said removable plate, an internally threaded bushing maintained in alinement with the aperture in said plate by said clamping element, a screw extending through said aperture for adjusting the position of said first named pair of upper and lower bearing segments with respect to their cooperating bearing segments, a plurality of metal working rolls rotatably mounted in the assemblies formed by said bearing segments, a prime mover secured to the upper portion of said truck, a telescopic driving connection between said prime mover and said metal working rolls, means for moving said vertically adjustable carriage, means for securing the same in adjusted position, means for moving said truck, and means for securing said truck against movement.

25. A rolling mill comprising a bed, a truck horizontally movable on said bed, a carriage mounted on said truck, a plurality of metal working rolls journaled in said carriage, means for relatively adjusting at least one of said metal working rolls vertically, means for universally adjusting at least one of the other of said plurality of metal working rolls about an axis coinciding with the point of intersection of its horizontal and vertical axes, a prime mover secured to the upper portion of said truck, a driving connection between said prime mover and said metal working rolls, a bearing supported by said truck for said driving connection, and means for securing said truck to said bed.

26. A rolling mill comprising a horizontally movable truck, a vertically adjustable carriage mounted on said truck, a plurality of vertically disposed metal working rolls supported by and journaled in said carriage, means for relatively adjusting at least one of said metal working rolls vertically, means for universally adjusting at least one of the other of said plurality of metal working rolls about an axis coinciding with the point of intersection of its horizontal and vertical axes, means for securing said carriage against movement, a prime mover secured to the upper portion of said truck, a telescopic driving connection between said prime mover and said metal working rolls, a bearing supported by said truck for said driving carriage, means for moving said truck, and means for securing said truck against movement.

FRED E. KLING.